May 31, 1960  J. R. URSCHEL  2,938,558
MEAT COMMINUTING MACHINE
Filed June 5, 1953  7 Sheets-Sheet 1

INVENTOR.
Joe R. Urschel
BY
Atty

May 31, 1960　　　J. R. URSCHEL　　　2,938,558
MEAT COMMINUTING MACHINE
Filed June 5, 1953　　　　　　　　　　　　　　7 Sheets-Sheet 2
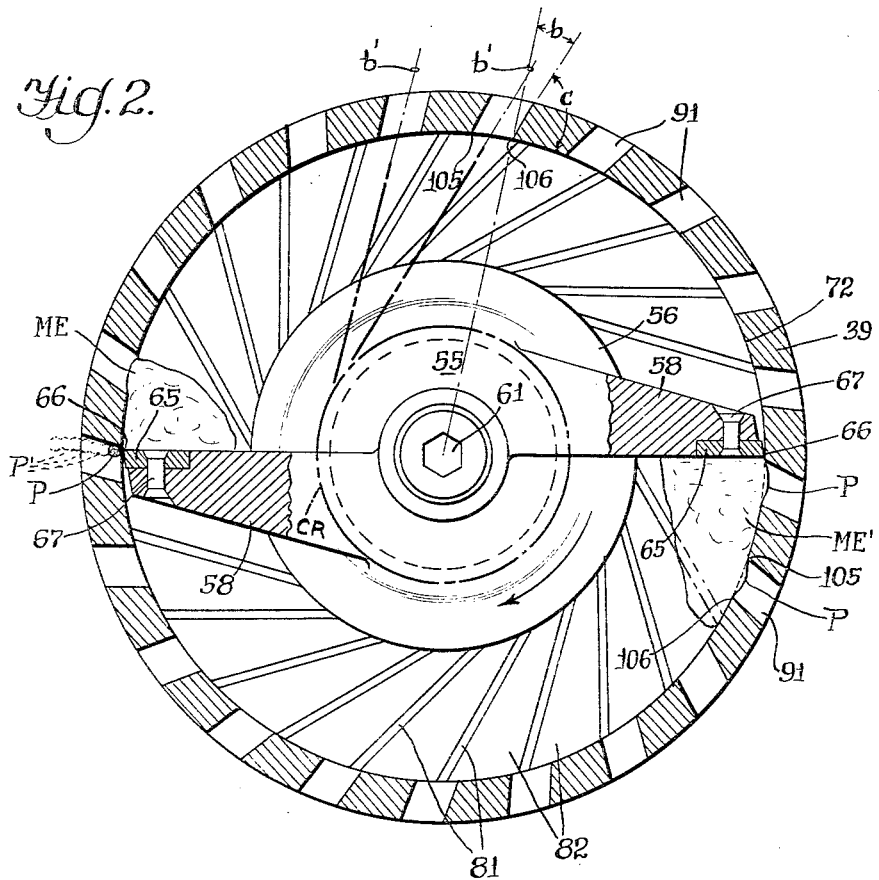
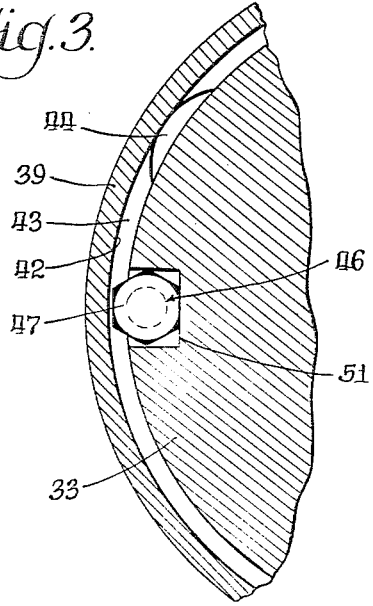
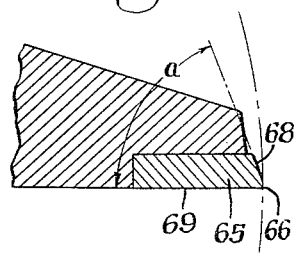
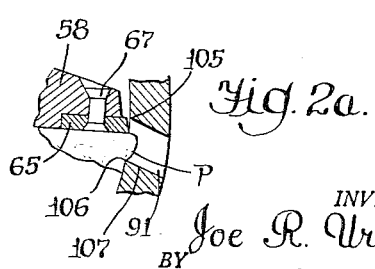
INVENTOR.
Joe R. Urschel
BY
Atty May 31, 1960    J. R. URSCHEL    2,938,558
MEAT COMMINUTING MACHINE
Filed June 5, 1953    7 Sheets-Sheet 3
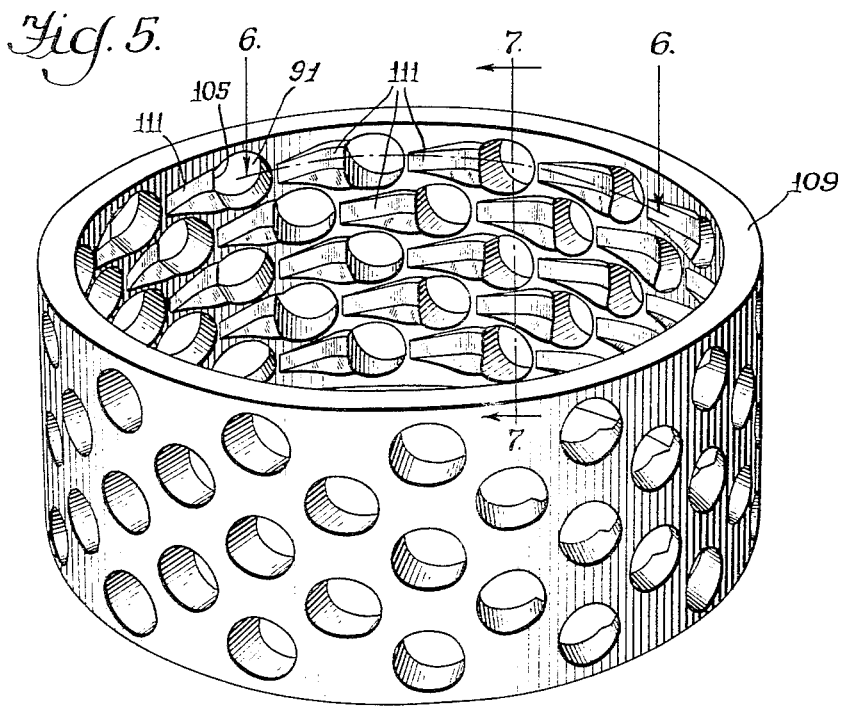
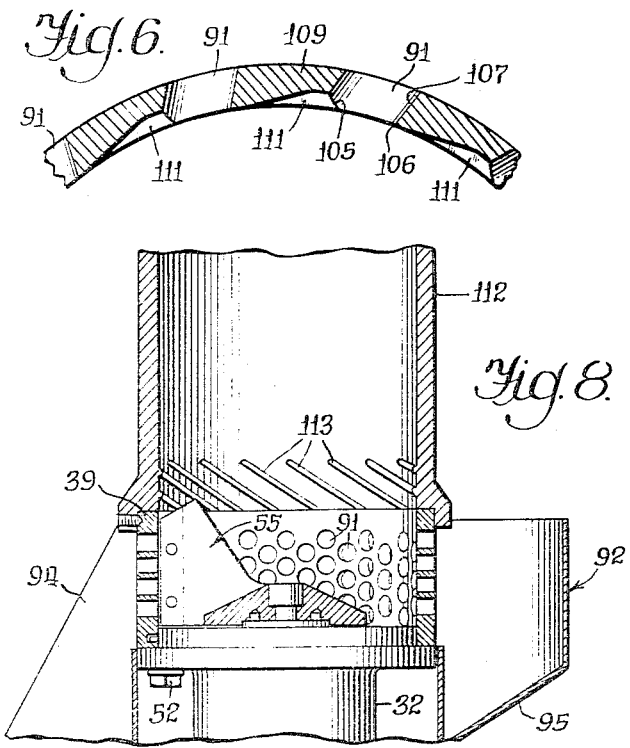
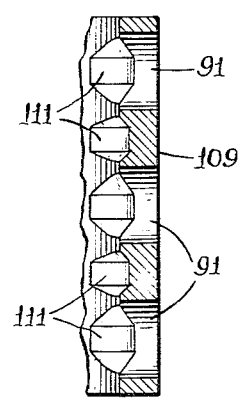
INVENTOR.
Joe R. Urschel
BY May 31, 1960 — J. R. URSCHEL — 2,938,558
MEAT COMMINUTING MACHINE
Filed June 5, 1953 — 7 Sheets-Sheet 4

INVENTOR.
Joe R. Urschel
BY
Atty

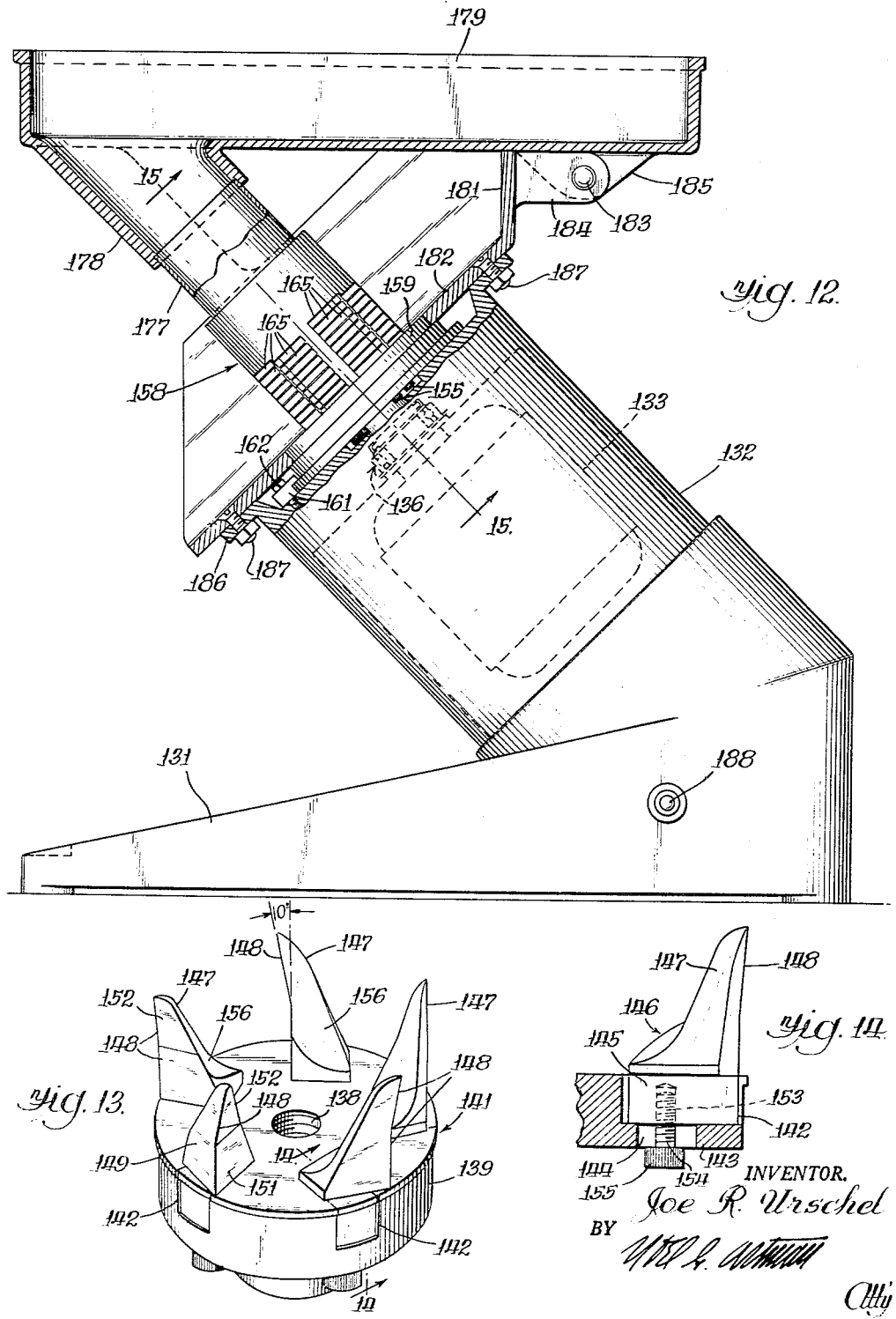

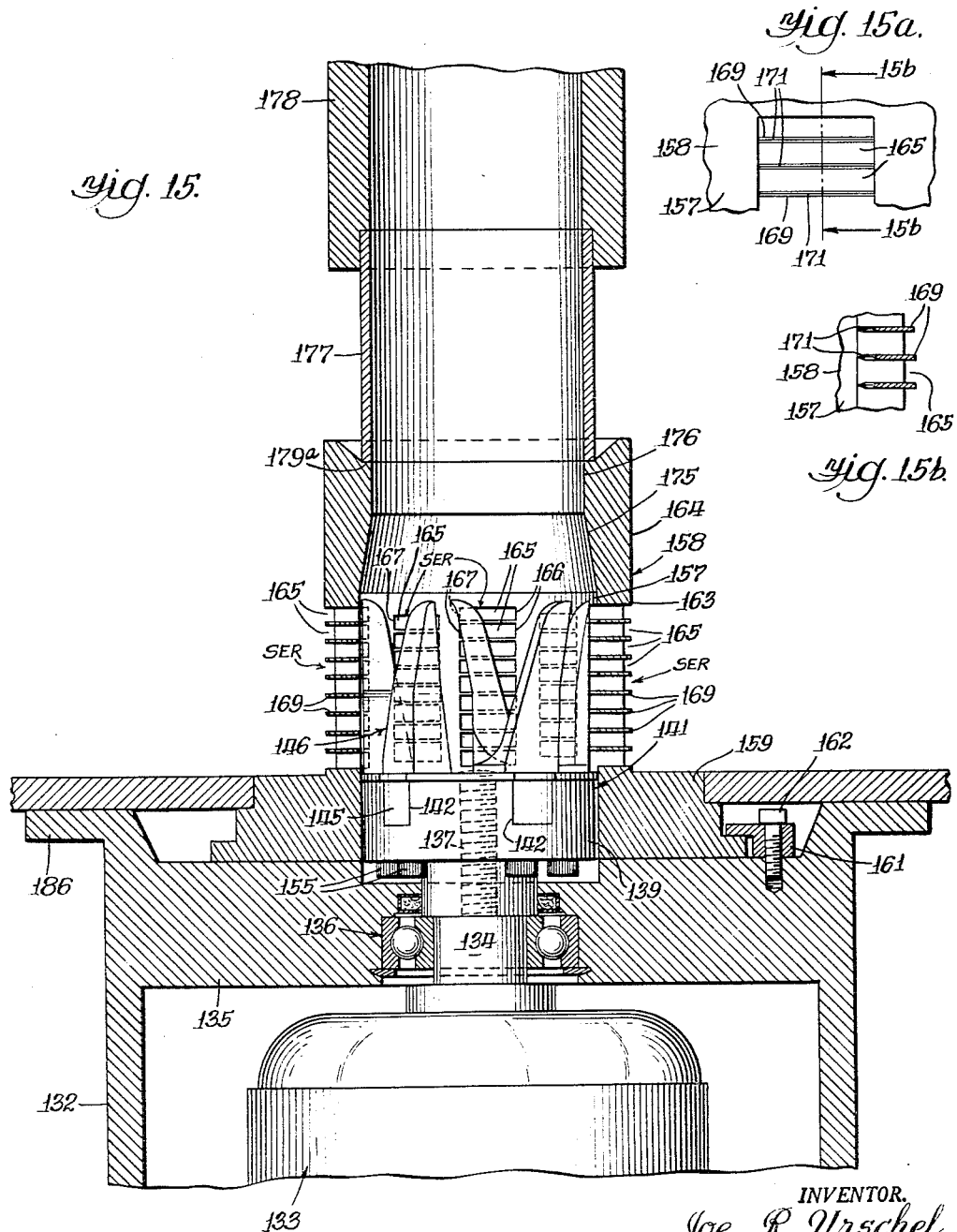

May 31, 1960

J. R. URSCHEL 2,938,558

MEAT COMMINUTING MACHINE

Filed June 5, 1953

INVENTOR.
Joe R. Urschel
BY
Atty

United States Patent Office

2,938,558
Patented May 31, 1960

2,938,558
MEAT COMMINUTING MACHINE
Joe R. Urschel, 158 S. Napoleon St., Valparaiso, Ind.

Filed June 5, 1953, Ser. No. 359,915

18 Claims. (Cl. 146—124)

This invention has to do with machines for grinding or cutting meat into small pieces similar to that found in hamburger, sausages and the like and more particularly concerns a machine by means of which meat in the process of being comminuted is subjected to a crushing action believed to break down part of the cell walls of the meat tissue thereby tenderizing the meat and improving its flavor.

It has been found that meat processed by cutting into small pieces for hamburger as a general rule has insufficient liberated meat juice for effecting an adequate sealed adhesion between the meat particles to prevent the formation of fissures and fragmentation of the meat patty during cooking thus causing considerable loss of such juices and shrinkage of the patty. Meat treated by the present machine overcomes this disadvantage by having a considerable portion of the meat tissue cell walls broken. This frees enough of the meat juices to adhesively hold the meat particles together even during cooking. Leakage of juices from the interior of the patty is therefore diminished as well as shrinkage, and the retention of these juices significantly improves the flavor of the product.

An important object of this invention is the provision of a new process of meat grinding by means of which the improved comminuted meat product of the above described character is obtainable, involving projecting surface portions from a body of meat, causing collision of these projected portions with crushing impact thereto against a relatively hard surface, and trimming the crushed portions from such meat body.

A further object is the provision of an improved meat comminuting or grinding process wherein whole pieces of meat to be ground are pressed centrifugally against a wall of a chamber having small bore discharge passages leading outwardly through such wall, causing the meat to slide upon such wall at high speed whereby a surface of the meat in contact with the wall ripples over the entrances of said passages to rupture part of the cell walls in the meat tissue at such surface, and shearing portions of the meat projecting into the passages from the whole pieces of the meat, thus forming meat fragments which are discharged through the passages by pressure received from succeeding cut-off fragments.

Another object of this invention is the provision of a meat comminuting or grinding machine having a chamber for the reception of whole pieces of meat, such chamber having a curved wall of substantial thickness against the inner surface of which the meat pieces are slid and centrifugally pressed during operation of the machine, wherein said wall contains discharge passages immerging through the inner surface of the wall at an angle thereto circumferentially of the chamber to form acute cutting edges at the intersection with the chamber wall inner periphery and cooperable with complemental shearing edges upon an impeller which carries such shearing edges in close proximity with such inner periphery.

Still another object is the provision of a machine according to the next preceding object wherein the thickness of the chamber wall is sufficient that the discharge passages leading outwardly therethrough present an impact surface of substantial area against which surface portions of the meat centrifugally bulged into the discharge passages are dashed with cell crushing force substantially at the instant of being sheared as crushed fragments from the meat in the chamber.

Another object is the provision in a chamber wall of the above described character wherein interior surface portions of the wall are relieved adjacent to approach edges of the meat discharge passages to expedite projection of meat surface portions into these passages preparatory to being crushed against impact areas of these passages and sheared from the chamber-contained meat pieces.

Another object is the provision in a meat comminuting or grinding machine chamber having a side wall with an inner periphery curved about a principal axis of such chamber, of a plurality of elongated slots communicating radially through such wall and extending circumferentially of said axis, and said passages having acute cutting edges at respective circumferential extremities thereof coincident with the inner periphery of the side wall.

Another object is the provision of a comminuting chamber according to the next preceding object wherein there are series of said elongated slots arranged in rows extending axially of the side wall and thus forming narrow webs or ribs separating the slots in each row from one another, and wherein there is meat cutting means upon said ribs on the side thereof disposed toward the inner periphery of the side wall.

Another object is the provision in a comminuting chamber according to the next preceding object wherein there are a plurality of said series of slots spaced circumferentially of the wall and wherein the slots of the adjacent series are staggered with respect to one another circumferentially of such wall.

The above and other desirable objects inherent in and encompassed by the invention will be elucidated in the ensuing description, the appended claims and the annexed drawings, wherein:

Fig. 2 is a horizontal sectional view taken substantially at the plane 2—2 in Fig. 1 illustrating the meat receiving chamber and one form of impeller therein.

Fig. 2a is a fragmentary detail sectional view illustrating the knife of one of the impeller blades of Fig. 2 in registry with one of the chamber wall discharge passages.

Fig. 3 is a fragmentary horizontal sectional view taken on the line 3—3 of Fig. 1 showing details of means for detachably fastening the meat receiving chamber side wall upon the bottom of such chamber.

Fig. 4 is a horizontal fragmentary sectional view enlarged, illustrating the assembly of a shearing blade upon one of the impeller wings.

Fig. 5 is a perspective view of a meat receiving chamber wall of modified form wherein the interior surface of such wall is relieved at areas respectively contiguous with approach edges of each of the discharge passages.

Fig. 6 is a fragmentary horizontal sectional view taken on the line 6—6 of Fig. 5 showing a detail of the relieved area adjacent the discharge passages through the chamber wall.

3

Fig. 7 is a vertical sectional view taken on the line 7—7 of Fig. 5 and further illustrating the association of the relieved areas upon the interior surface of the chamber wall with the discharge passages.

Fig. 8 is a fragmentary vertical sectional view taken diametrically through a feed hopper and meat receiving chamber of modified form.

Figure 9:
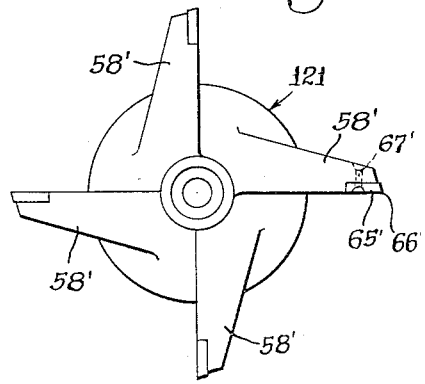

Fig. 9 illustrates an impeller differing from that shown in Fig. 2 in the respect of having four wings and blades instead of two.

Figure 10:
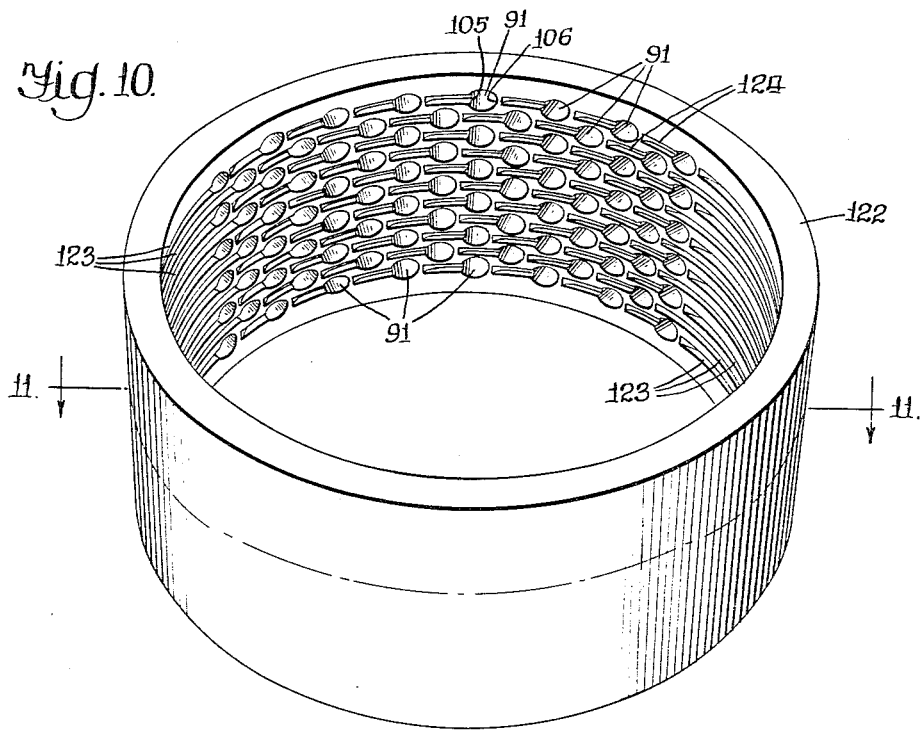

Fig. 10 is a view similar to Fig. 5 of a chamber side wall having the discharge passages limited to a circumferential portion thereof and having circumferential grooves in the inner surface of the remaining portion of such wall.

Figure 11:
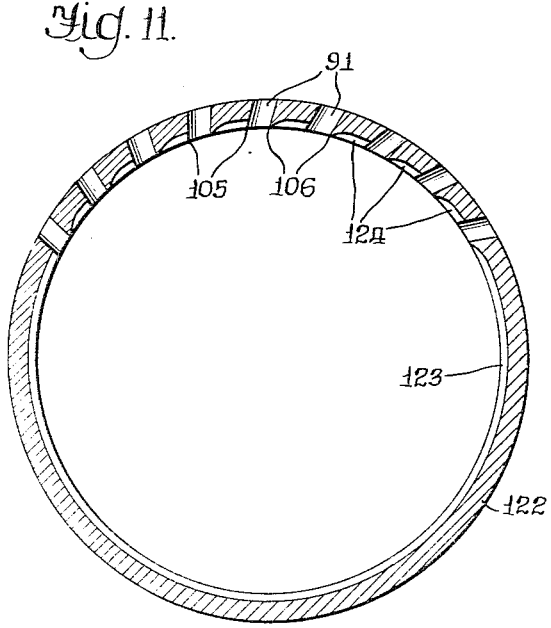

Fig. 11 is a horizontal sectional view taken on the line 11—11 of Fig. 10.

Fig. 12 is a side view partly in elevation and partly in section of the preferred embodiment of the invention.

Fig. 13 is an enlarged perspective view of a five bladed impeller utilized in the comminuting chamber of the Fig. 12 embodiment.

Fig. 14 is a fragmentary sectional view taken substantially on the plane of the line 14—14 of Fig. 13.

Fig. 15 is a fragmentary sectional view taken on a plane coinciding with the principal axis of the comminuting chamber of the Fig. 12 embodiment and as indicated by the line 15—15 of Fig. 12.

Fig. 15a is a fragmentary view of the inner periphery of the chamber wall wherein the ribs between discharge passages have a knife edge form of meat cutting means thereon.

Fig. 15b is a fragmentary sectional view taken on the line 15b—15b of Fig. 15a.

Figure 16:
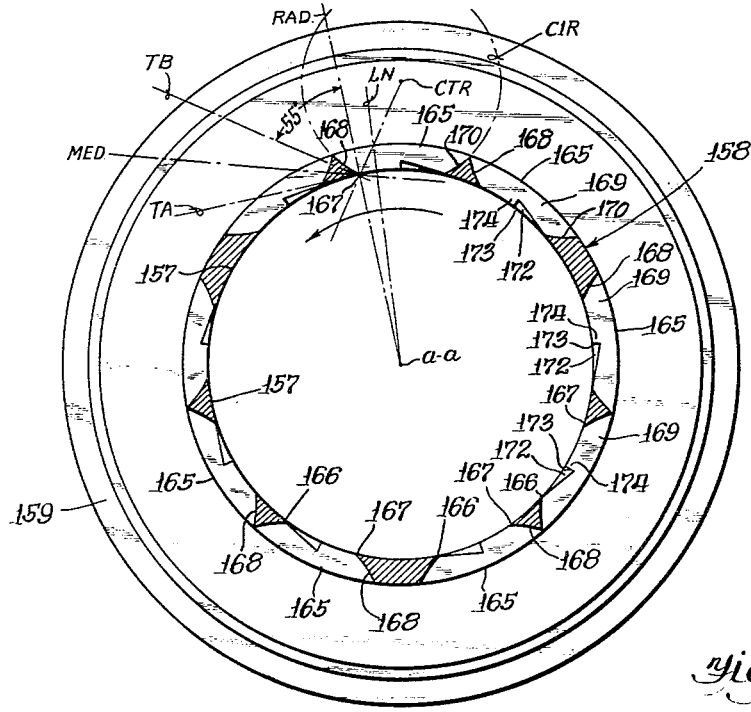
Figure 17:
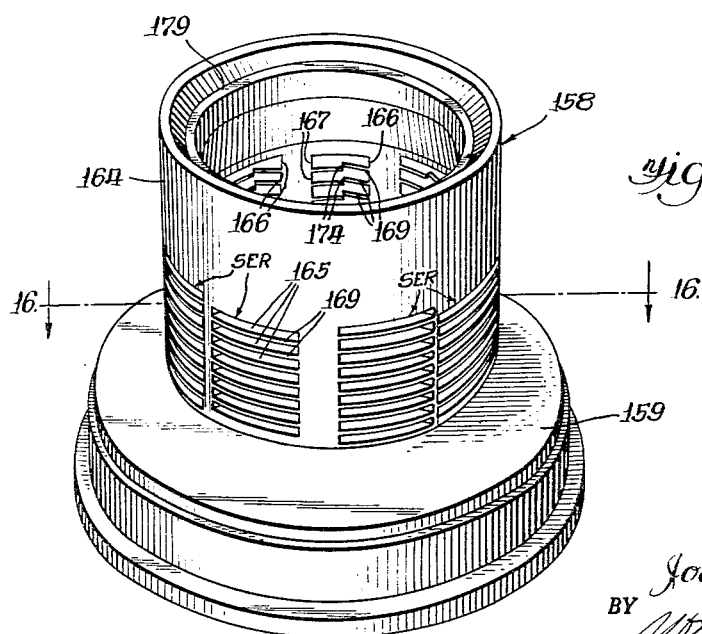

Fig. 16 is a transverse sectional view taken at the plane indicated by the line 16—16 of Fig. 17.

Fig. 17 is an enlarged perspective view of the comminuting chamber of the invention embodiment shown in Fig. 12.

Figure 1:
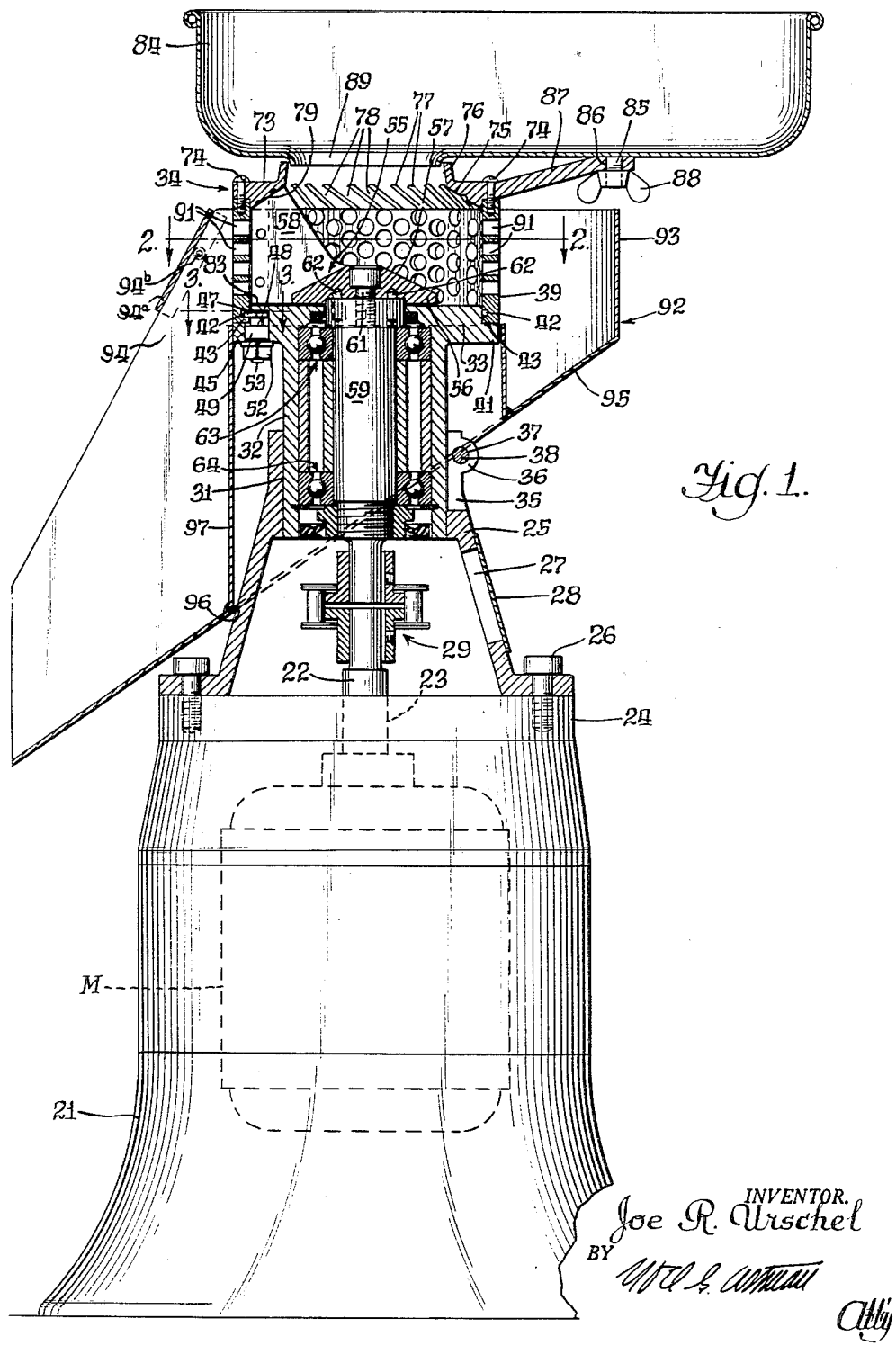
Fig. 1 is a vertical view of a machine constructed in accordance with this invention, the lower part of the view illustrating the base of the machine in elevation and the upper part of the view illustrating in section a meat receiving hopper, a meat receiving chamber with meat discharge passages in a side wall thereof and an impeller partly in section and partly in elevation within such chamber.

With continued reference to the drawings and particularly to Figs. 1 and 2, the machine can be seen to have a large hollow base 21 which houses an electric motor M shown by dotted lines and having an armature shaft 22 extending upwardly through an opening 23 in a cover plate 24 for the upper end of said base. A hollow conical pedestal 25 is mounted upon the upper end of the base 21 by means of cap screws 26 and contains a side wall access opening 27 normally covered by a plate 28 and through which a shaft coupling device 29 is accessible. An interior surface 31 in the upper part of the pedestal 25 is cylindrical and receives the lower part of a cylindrical stem 32 which projects downwardly from a bottom plate 33 of a meat receiving chamber 34. Said upper portion of the pedestal 25 contains a vertical slit 35 and on each side of such slit has an apertured ear 36 formed integrally therewith, one of such ears being shown in Fig. 1. The apertures, 37, in said ears are coaxial and receive a bolt shank 38 by means of which said ears can be drawn together for contracting the cylindrical surface 31 tightly onto the stem 32 for rigidly assembling these parts.

A cylindrical side wall 39 of the chamber 34 rests upon a circumferential flange 41 of the chamber bottom plate 33. The inner periphery of this cylindrical side wall contains a circumferential groove 42 adjacent its lower end, and an inwardly projecting flange 43 bordering the lower side of this groove contains three arcuate notches 44 spaced apart 120° about the principal axis of the chamber, one of these notches being shown in Fig. 3. The bottom plate 33 contains three upward extending bores 45 likewise spaced apart 120° about the chamber axis. Each bore 45 contains a bolt 46 having a hexagonal head 47 upon its upper end, a small diameter shank portion 48 adjacent to said head and a large diameter shank portion 49 slidable axially in its associated bore 45.

In assembling the chamber wall 39 with the chamber bottom plate 33, such wall is positioned rotatively to place the flange notches 44 in respective registry with the bottom plate bores 45 whereupon the bolts 46 are inserted upwardly, heads 47 foremost, into the bores to project these hexagonal heads through the notches 44 and above the flange 43. Following this assembly step the chamber wall 39 is rotated to carry the notches 44 out of registry with the bores 45 while portions of the bolt heads 47 are received by the groove 42. Rotation of the bolts 46 about their individual axis is prevented by one of the facets on these hexagonal heads bearing against an associated plane face 51, Fig. 3, in an upper end portion of the bore 45. Hence, upon the turning of nuts 52 upon threaded shank portions 53 at the lower ends of the bolts 46 these bolts are drawn downwardly to press edges of their heads 47 against the flange 43 to rigidly assemble the cylindrical side wall 39 with the bottom plate 33.

Inside the meat receiving chamber 34 is a rotary impeller 55 having a base 56 of low elevation with a conical upper surface 57. A pair of impeller wings 58 project substantially diametrically oppositely from the base 56 which is rotatable coaxially of the chamber 34. The impeller base is mounted upon the upper end of a vertical shaft 59 by means of a cap screw 61 and a pair of dowels 62 which constrain the rotor for rotation with the shaft 59. Said shaft is rotatively carried within the tubular stem 32 by upper and lower ball bearing units 63 and 64. A reduced diameter lower end portion of the shaft 59 is constrained for rotation with the flexible shaft coupling device 29 and is thus caused to rotate at the speed of the motor armature shaft 22.

Hardened steel blades 65 having vertical cutting edges 66 are secured to the radially outer ends of the impeller wings 58 by means of rivets 67. In Figs. 2 and 4 it can be seen that radially outer end faces 68 of these blades 65 intersect their forward faces 69 at an acute angle a, thereby improving the cutting efficiency of the vertical cutting edges 66 and increasing the conduciveness to these outer end faces of the blades shedding meat particles during rotation of the impeller 55 in the direction of the arrow thereon in Fig. 2.

An annular meat feeding element 73 is secured to the upper end of the cylindrical chamber wall 39 by screws 74. This feeding element has a conical inner periphery 75 flaring downwardly from a throat 76. A plurality of grooves 77 and intervening ribs 78 formed thereby spaced circumferentially of the annular element 73 upon the conical periphery 75 extend radially outwardly of such periphery and somewhat circumferentially thereof in the direction the impeller blades 65 are swept about the chamber. The impeller wings 58 have diagonal upper end edges 79 which slope downwardly and radially outwardly of the chamber in parallelism with and in close proximity to portions of the conical periphery 75 registering therewith radially of the chamber 34.

In Fig. 2 there can be seen a plurality of grooves 81 forming intervening ribs 82 in the upper face of the chamber bottom plate 33, all of which extend tangentially with respect to the chamber axis and lead radially outwardly of the chamber somewhat in the direction of rotation of the impeller 55. The lower face of the impeller hub 56 and the lower edges 83 of the impeller wings 58 sweep in close proximity with the upper faces of these ribs 82 during operation of the machine.

A meat receptacle or hopper 84 is mounted upon the annular feeding element 73 to which it is detachably secured by a threaded stud 85 projecting downwardly therefrom through a hole 86 in an arm 87 projecting from the element 73. A wing nut 88 is turned upon the lower end of the threaded stud 85. Meat is fed from the hopper downwardly through a flanged bottom opening 89 and through the annular feeding element 73 into the chamber 34.

Meat discharge passages 91 formed in the chamber side wall 39 discharge into a receiver 92 having a semicircular side wall 93 with parallel extensions 94 extending downwardly and forwardly (to the left as viewed in Fig. 1) on respectively opposite sides of the chamber 34 and spaced therefrom a distance substantially equal to the spacing of the wall 93 from such chamber. A flat downwardly and forwardly sloping bottom plate 95 is secured at its sides and curved upper edge to the lower edges of the wall forward extensions 94 and the lower edge of the rear semicircular wall 93. A circular hole 96 in the sloping plate 95 receives the machine frame pedestal 25 as does a cylindrical inner wall 97 which is joined to said plate at the perimeter of said hole. This inner wall 97 and the hole 96 are large enough in diameter to telescope downwardly over the chamber wall 39 before attachment of the feed element 73 to the upper end of such chamber wall. A guard plate 94a held by screws 94b bridges the extensions 94.

The chamber wall discharge openings 91 are in the form of cylindrical bores of which the individual axes $b'$ are directed tangentially of a dot-dash circular line CR coaxial with the vertical principal axis of the chamber as illustrated in Fig. 2. Each of these discharge passages 91 has an approach edge 105 which the impeller blades 65 first encounter during rotation of the impeller and departure edges 106 where said blades depart from said passages; see Fig. 2. The departure edges 106 of these passages are formed at the intersection of respective impact walls 107 of said passages and the inner periphery 72 of the chamber wall. Inasmuch as these impact walls or surfaces 107 are parallel with the respective axis $b'$ of such passages said surfaces form an acute included angle $c$ with the internal periphery 72 and lend to said edges 106, which are cutting edges, an acute rake angle $b$.

*Operation of the first embodiment, Figs. 1 through 4*

The machine is set in operation by starting the electric motor M of which the armature shaft 22 rotates clockwise as viewed from above. This imparts clockwise rotation to the impeller 55 as viewed in Fig. 2. Pieces of meat suitable for hamburger, for example, and which had been placed in the hopper 84 are then fed downwardly through the opening 89 into the meat receiving chamber 34. Typical pieces of such meat are designated ME and ME' in Fig. 2. These are engaged by the wings 58 and revolved thereby about the interior of the chamber. Centrifugal force causes these pieces of meat to be pressed against the inner periphery 72 of the chamber wall whereby the surface portion of these meat pieces in contact with the wall periphery is caused to ripple over the inner ends of the discharge passages 91. Portions $p$ of the meat pieces ahead of the propelling wings by a distance exceeding the diameter of the passages 91 are held sufficiently firmly to the main bodies of these meat pieces to avoid being bulged far into the passages and therefore are pulled back into the chamber over the departure edges 106 of these openings after having been partly projected into the passages. This will be understood by reference to the lowermost of the passages 91 with which the meat pieces ME' register; see Fig. 2. Here it will be noted that meat of the piece ME' engages the inner periphery of the wall 39 marginally counterclockwise from the approach edge 105 and marginally clockwise from the departure edge 106. Because portions of the meat thus marginally border this discharge passage 91 the meat portion $p$ is limited in the distance it can project into such passage. As that marginal part of the meat piece engaging the wall 39 in a clockwise direction from the departure edge 106 is forced clockwise along the wall it tends to pull the projecting portion $p$ radially inwardly of the chamber. While the projecting piece $p$ of meat is being drawn or scraped over the departure edge 106 of said passage 91 there is some degree of cell wall breakdown of the tissue in this meat portion.

With regard, however, to a projecting surface portion $p$ of the meat at the inner end of a discharge passage 91 with which the cutting edge 66 of a blade 65 is in registry as illustrated in Fig. 2a, there is no portion of the meat piece extending marginally from the approach edge 105 of such passage whereby the trailing part of this portion $p$ can slide radially of the front face of the blade 65 more distantly into the passage 91. As a consequence these portions $p$ immediately in front of the knife edges 66 are dashed against the impact surface 107 of the passage into which they have been projected. This dashing of these particles against the impact surfaces 107 further crushes the cell walls of the meat tissue, and substantially simultaneously with this crushing action against the impact surfaces 107 the cutting edge 66 of the blade 65 will cooperate with the departure edge 106 to shear and hence sever this crushed particle from the main body of the meat piece wherefore the departure edge 106 also serves as a cutting edge.

In Fig. 2 a crushed portion $p$ of the meat is illustrated in the left hand part of the figure at the instant of being cut off from the main body of the meat piece ME by the proximate blade 65. Previously crushed and cut off portions of the meat are designated $p'$. These crushed and cut off portions of the meat tend to cling together because of the adhesive effect of juice from the meat released by the cell wall rupture of the meat tissue whereby the meat is discharged in tentacle like fashion through the discharge passages.

The tangential grooves 77 and intervening ribs 78 in the annular feeding element deflect the surface of the revolving meat in contact therewith radially outwardly and downwardly into the chamber 34. Larger pieces of meat can thus be effectively drawn into the chamber, and the centrifugal force on the meat is supplemented for pressing the meat against the cylindrical wall of the chamber. These grooves 77 and ribs 78 also preclude accretion of meat particles on the surface 75 that would develop friction and heat if rubbed by the upper edges 79 of the impeller wings. Radial deflection of the meat is also incurred by coaction of the tangential ribs 82 and grooves 81 on the chamber bottom when the impeller rotates. Diminution of friction heat by thus eliminating a compacted accumulation between the end walls of the chamber and the impeller reduces power consumption of the machine in addition to avoiding undesirable darkening of the meat tissue which can occur at temperatures attainable in conventional meat grinding machines.

Other structural features contributing to keeping the meat at a relatively low temperature during processing in the machine are the rather critical spacing of the knife edges 66 from the inner periphery 72 of the chamber wall 39 and the provision of the rake angle $b$. Such spacing of cutting edges 66 from the wall periphery is preferably .003". This dimension has been determined from experimentation with a chamber wall 39 having an inside diameter of 5" and an impeller speed of 1700 r.p.m. When operating the impeller at this speed shearing action is had between the knife edges 66 and the wall passage departure edges 106 despite the .003" wall clearance. Such spacing clearance in avoiding direct rubbing contact between shearing parts as in conventional meat grinders significantly diminishes the necessary power for operating the machine. A one horsepower electric motor M is adequate for the present machine when the 5" inside diameter chamber wall is 2" high. When the clearance between the knife edges 66 and the wall periphery 72 is diminished below .002" the meat is heated significantly more and the ground meat has a texture undesirably mushy for customer acceptance.

Rake angle $b$ is preferably 15°. When this angle is increased beyond 25° the shearing or departure edges 106 of the discharge passages 91 cut the meat too readily or the impact surfaces 107 of these passages deflect the meat portions $p$ too readily without sufficient crushing thereof wherefore the finished product is more stringy in character than desired. If the rake angle $b$ is decreased below 5° the shearing action of the passage edges 106 is diminished and the impact surfaces 107 are struck so squarely by the meat particles p that the meat tends to become over crushed or too mushy. Also the meat is heated more and the machine required more power.

Considering further the construction of the chamber wall 39, it must have a radial thickness for the impact surfaces 107 to have sufficient dimension to be dashed against by the meat particles p sheared off by the knife edges 66. In a thin wall these meat portions could simply fly through the passages 91 without collision with a crushing surface. This wall is preferably ¼" and at least ³⁄₁₆" thick. The diameter of the passages 91 is preferably ¼" for cutting beef into hamburger and the center spacing of these holes is preferably about ⅜".

Chamber wall structure of Figs. 5, 6 and 7

The chamber wall 109 shown in Figs. 5, 6 and 7 may be substituted for the wall 39 in the machine described above. This chamber is in all respects like that described above except for the presence of relieved areas 111 adjacent the approach edges 105 of the discharge passages 91. These relieved areas facilitate the entry of the meat portions p into the passages 91. Less heating of the meat results whereby its red color is better preserved and deterioration delayed. Tough meat is processed and better tenderized with this interior wall surface structure. A portion of suet mixed with lean meat will also be comminuted and mixed with the ground meat when this form of wall is employed.

Fig. 8 modification

Fig. 8 discloses a machine differing from that shown in Fig. 1 in the sole respect of having a modified hopper 112 of cylindrical shape. This hopper replaces both the hopper 84 and the annular feeding member 73 of Fig. 1. Helical ribs 113 formed interiorly of the hopper 112 near its lower end deflect the cylindrical outer periphery of a rotating mass of meat in such hopper downwardly into the chamber 39 to supplement gravitational feeding pressure.

Fig. 9, impeller modification

The impeller 121 is generally like that shown in Figs. 1 and 2 except for having four wings 58' instead of two. Each wing has a blade 65' corresponding to the blades 65 and these blades are secured in place upon the wings by rivets 67'. Vertical edges 66' on the blades correspond to the edges 66 of blades 65. By substituting the four winged impeller 121 for the two bladed impeller 55 the surface of meat rippling over the inner peripheries of the chambers 39 or 109 will remain in contact with such periphery only one-half the time as when the two-winged impeller is used. Consequently less heat is developed in the meat as it is processed.

Figs. 10 and 11 modification

The meat receiving chamber wall 122 of Figs. 10 and 11 differs from the wall 39 of chamber 34 by concentration of the discharge passages 91 within about one-third of the wall circumference, and by providing parallel internal circumferential grooves 123 in the remaining two-thirds of the wall circumference. These grooves 123 lead to the approach edge 105 of respectively associated passages 91. Shorter grooves 124 lead to the approach edges of the remaining passages 91. Both grooves 123 and 124 provide radially relieved areas at the approach edges of the passages 91, thus serving the purpose of the relieved areas 111 in Fig. 5. Long grooves 123 have the effect of diminishing the adhesion between the meat and the inner periphery of the wall without rippling the meat surface and thus reduce heating of the meat and of the power necessary for operating the machine.

Figs. 12 through 17 modification

A base 131 for this embodiment of the invention supports a cylindrical housing 132 mounted thereon with its principal axis inclined at an angle of substantially 45°. Housing 132 has an electric motor 133 mounted coaxially therein. Motor 133 is shown by dotted lines in Fig. 12 and the upper portion thereof is shown in full lines in Fig. 15. The armature shaft 134, Fig. 15, of the motor is journaled in an upper end wall 135 of the cylindrical housing 132 by means of a ball bearing unit 136. A reduced diameter and threaded upper end portion of the armature shaft 134 is designated 137 and is turned into a threaded bore 138, Fig. 13, of an impeller base 139.

The base 139 of the impeller 141 contains five radial notches 142 spaced equiangularly with respect to the principal axis of this base. Each notch communicates radially outwardly through the cylindrical periphery of the impeller base and also communicates upwardly through the upper flat face of such base. In Fig. 14 it can be seen that one of the notches 142, which is identical in structure with each of the others, has a bottom wall 143 containing a slot 144 extending radially of the rotor base 139. Each notch 142 slidably receives the base 145 of an impeller element 146. Each impeller element comprises an upwardly extending prong portion 147 having a shearing edge 148 formed at the intersection of an outer face 149 with an upright face 151 and a forwardly inclined hooking face 152. The base of each impeller element 146 has a threaded recess 153 in the bottom thereof into which there is threaded a shank 154 of a cap screw 155. The threaded shanks 154 of these cap screws are received by the radial slots 144 and are adjustable lengthwise thereof radially of the impeller head 139 pursuant to adjusting the impeller elements 146 radially of the head 139. When it is desired to resharpen the impeller element cutting edges, such elements are adjusted a few thousandths of an inch radially outward, and thereafter the entire impeller head assembly is rotated about its axis while the cutting edges are sharpened by grinding back to lie within a common cylindrical path of a radius to properly space these edges from the chamber wall.

The cylindrical rotor base 139 is received coaxially within the lower portion of a cylindrical inner periphery 157 of a comminuting chamber 158. This lower portion of the cylindrical inner periphery is within a base portion 159 of the chamber 158. The bottom of this base 159 rests upon the upper end of the housing end wall 135 to which it is secured by clamping members 161 spaced circumferentially thereabout (one being shown in Fig. 15) and secured to the end wall by cap screws 162. A lower cylindrical portion 163 of a side wall 164 extending upwardly from the base 159 and also containing said cylindrical inner periphery 157 contains a plurality of discharge passages 165 extending radially therethrough. As shown in each of Figs. 12, 15, 16 and 17, these side wall passages 165 are elongated circumferentially of the cylindrical wall portion 163 and are each provided with circumferentially spaced narrow extremities 166 and 167. Meat deposited within the chamber 158 is revolved counter-clockwise therein with the impeller 141 as viewed from above in Fig. 15. Therefore, the meat as it is revolved in the chamber 158, is pressed centrifugally against the inner periphery 157 of the chamber side wall portion 163. The meat therefore approaches each of the passages 165 at the extremities 166 and departs therefrom at their extremities 167. These extremities 167 are in the form of cutting edges within the inner periphery 157 of the side wall portion 163, and such cutting edges would therefore be departure edges in the sense that they are the edges at the ends of the passages 165 from which the revolving meat departs from these passages. Each passage 165 also has a narrow impact side 168 which intersects the side wall inner periphery 157 coincidentally with the departure edge 167 thereof and at an acute included angle of which the median is directed obliquely oppositely to the direction of movement of the meat in registry therewith along said wall. In Fig. 16 this acute included angle is illustrated with respect to a departure edge 167 in the upper part of the figure, where such angle is included between lines TA and TB which intersect at the edge 167. Line TB is tangential to a milling wheel circle CIR having a center CTR, and the point of tangency with such circle is at such departure edge 167. The line TA is tangential to the circular inner periphery 157 of the meat receiving chamber 158 at said departure edge 167. Each of the slot-like discharge passages 165 is formed by cutting into the outer periphery of the chamber wall 163 by a milling wheel not shown having a circumferential profile conforming to the circle CIR. When the milling wheel is advanced radially inwardly with respect to the wall 163 to cut the opening 165 associated therewith to be of proper length circumferentially of the wall 163, narrow opposite sides 168 and 170 of the resulting passage will have concave curvature conforming to the circle CIR. The concave narrow side 168 is the impact side mentioned hereinabove.

The included angle included between the lines TA and TB for each of the edges 167 has a median line MED bisecting such included angle. This median line MED is directed obliquely oppositely to the direction of movement of meat propelled by the impeller 141 in registry with the edge 167 where the median line intersects the inner periphery of the chamber wall, assuming the direction of the median line to be in the direction the angle TB–167–TA associated with the median MED points. Said median line MED for each of the included angles TB–167–TA is also directed inwardly of the chamber wall into diagonal intersection with a respectively associated line LN extending radially from the chamber axis a–a through the respectively associated opening 165 in contiguity with the departure edge 167.

As is visible in each of Figs. 12, 15, 16 and 17, the passages 165 are grouped in respective series SER of such passages, the passages in each series being in lateral juxtaposition axially of the chamber side wall 163, and each series of passages extending axially of the chamber. Portions of the wall 163 between the passages 165 in each series SER are in the form of ribs 169 of less transverse width axially of the chamber than said passages, said ribs forming boundaries for long edges of said passages 165 and constituting separating means therebetween. Meat cutting means on the sides of said ribs 169 facing inwardly of the chamber 158 may be in the form of sharpened edges 171 on the inner edges or sides of said ribs facing inwardly of the chamber as illustrated in the species of Figs. 15a and 15b. It is preferred, however, to provide cutting means on the inner sides of the ribs 169 by forming notches 172 therein as illustrated in Figs. 16 and 17, with the effect of forming shoulders 173 and slitting teeth 174.

A downwardly flared inner peripheral portion 175 of the chamber wall 164 is adapted to guide meat downwardly into the cylindrical peripheral portion 157 of the chamber wall. Immediately above the downwardly flared conical periphery 175 is a cylindrical internal wall periphery 176 which is of the same diameter as the cylindrical internal periphery of a feeding tube 177, mounted in the lower end of a feeding spout 178 formed integrally with a hopper tray 179. The lower end of the feeding tube 177 removably rests upon a seat 179a on the upper end of the chamber side wall 164. In Fig. 12 the hopper tray 179 can be seen to be pivotally connected with a rear wall 181 of a ground meat receiving apron 182 by means of a pivot pin 183 extending through laterally spaced apertured studs 184 (one being shown) on said wall 181 and through an apertured ear 185 depending from the lower side of the hopper tray 179 between the studs 184. The apron 182 is mounted upon a circular flange 186 at the upper end and of the motor housing 132 by means of machine screws 187.

*Operation of the Figs. 12 through 17 embodiment*

With the machine arranged as shown in Fig. 12, that is, with the hopper tray 179 pivoted counter-clockwise into the horizontal shown whereby the lower end of the feeding tube 177 rests upon the seat 179a at the upper end of the chamber 158, pieces of meat suitable for cutting into hamburger or a similar product (not shown) are placed in the hopper tray preparatory to being fed downwardly through the spout 178. Thereupon a control switch handle 188 on the side of the base 131, Fig. 12, is manipulated conventionally for energizing the electric motor 133. Thereupon the armature shaft 134 of the motor together with the impeller 141 is caused to rotate counter-clockwise as viewed from their upper ends. This causes counter-clockwise revolving motion of the pronglike impeller elements 146 within the meat receiving chamber 158 whereby the cutting edges 148 of these impeller elements are swept contiguously with and about the cylindrical inner periphery 157 of the chamber side wall portion 163 containing the passages 165. As the meat is fed downwardly through the spout 178, the feeding tube 177, the cylindrical periphery portion 176 of the chamber side wall portion 164 and through the downwardly flared conical wall periphery 175 into the lower part of the chamber where the meat is engaged by the revolving impeller elements 146, such impeller elements upon engaging the meat cause it to revolve therewith. Centrifugal force of the revolving meat upon the downwardly flared wall surface 175 develops a downward force vector tending to pull the meat downwardly through the feeding passage including the tube 177 into the lower part of the chamber 158. Frictional engagement of the revolving meat with the cylindrical inner periphery 157 of the chamber 158 develops a reaction force upon the inclined hooking faces 152 of the prong-like impellers 146 thereby developing a further downward force vector upon the meat for supplementing the force of gravity in causing downward movement of the meat within the chamber 158.

As the meat is thus revolved within the lower cylindrical portion of the chamber 158, surface portions thereof bulge outwardly into the passages 165 and are trimmed or snipped off from the main body portion of the meat within the chamber by cooperation of the cutting edges 148 of the impellers with the departure edges 167 of the passages 165. When the passages 165 are relatively narrow to cause the removal of meat particles of a size suitable for forming hamburger meat, these particles as they are sheared off at the departure edges 167 are dashed against the impact sides or surfaces 168, Fig. 16, of the passages 165 similarly to the meat described hereinabove in connection with the first embodiment of the invention. Such collision of the cut-off meat particles with the impact surfaces 168 breaks down the cell walls of the meat to increase its tenderness.

The rake angle for these impact surfaces 168 adjacent the cutting edges 167 respectively associated therewith is preferably about 55°, this being the included angle between the tangent line TB and the radius line RAD extending radially from the chamber axis a—a through such edge 167 as illustrated in Fig. 16, when the chamber side wall 163 is formed with slots 165 of the proper width for cutting meat into pieces for hamburger. Cell wall crushing of the meat by the impact surfaces 168 is supplemented by the cutting means on the ribs 169, particularly when this cutting means is in the form of the teeth 174.

After considerable experimentation it has been found that for preparing hamburger a meat receiving chamber 158 having elements of the following dimensions are most satisfactory when the inside diameter of the chamber wall is 3″: The width of the slot-like passages 165 axially of the chamber is .125″. The thickness of the ribs 169 axially of the chamber is .040″. The forward slope of the upper portion of the cutting edges 148 of the impeller blades is 10° from the vertical as illustrated in Fig. 13, and the preferred spacing of the cutting edge 148 from the inner periphery of the chamber wall 163 is .002″. The satisfactory operating speed for the impeller 141 is 3600 r.p.m.

The narrowness of the slot-like discharge passages 165 axially of the chamber wall limits the distance surface portions of the revolving meat can project radially outwardly into these passages beyond the inner periphery of the wall whereby a relatively great proportion of these radially projecting portions of the meat collide with the departure surfaces 168 when being snipped off by the complemental cutting edges 148 of the impeller prongs 147. Consequently there is considerable impact and cell rupture of the processed meat despite the relatively larger rake angle (illustrated as 55° in Fig. 16) than in the preceding species of the invention wherein the discharge passages through the chamber wall are in the form of cylindrical bores. Increasing the rake angle correspondingly increases the acuteness of the cutting angle TB–167–TA for the cutting edge 167. Easier cutting of the meat is thus obtained with diminished heating thereof during processing. The meat slitting means 174 or 171 on the inner sides of the ribs 169 prepare the meat so it passes through the machine more quickly and with less heat generation.

This general species of the machine is also adapted to be made of dimensions for cutting larger fragments of meat than are generally considered suitable for hamburger, for example, barbecue fragments. When the length of the discharge passages 165, circumferentially of the chamber at its inner periphery, are increased to a length of approximately 1⅛″ and to a width of approximately ½″, bigger pieces of meat are of course cut and discharged through these passages forming a product suitable for fragmentated barbecue use. Increasing the width of the discharge passages 165 in this manner enables portions of the revolving meat to bulge further radially outwardly into these passages for being cut off at the cutting edges 167. The distance the meat particles can project outwardly is also increased by the meat being slit or ripped by the teeth 174 on the ribs 169. Since a greater portion of the meat projects outwardly into the passages 165, a less percentage thereof will be crushed against the impact surfaces 168.

In addition to a machine with slot dimensions as those described in the next preceding paragraph being suitable for producing fragmentated barbecue meat, a machine of such dimensions is also suitable for performing a pre-grind upon lean meat and a similar pre-grind upon fat and suet ran separately through the machine with respect to the lean meat. The teeth 174 upon the ribs 165 enable this machine to cut the suet sufficiently so that portions of it can project out into the passages 165 for being cut into small chunks when they encounter the edges 167. The fat and suet thus prepared into pieces larger than the fragments in hamburger and the pre-ground lean meat can then be mixed together in a proper proportion preparatory to being run through a machine of the character above described with respect to the present species having passages of dimensions for the cutting of hamburger meat. When hamburger is prepared in this way the fat and suet emerge in the finished product as separate particles in contrast to being smeared over the lean meat wherefor the red color of the lean meat is plainly visible and the quality of the product readily discernable. The relatively large rake angle employable in this species of the machine having the narrow slot-like discharge passages facilitates the meat being cut with the dissipation of less energy wherefor the meat is maintained at a relatively cool temperature during processing. This avoids the meat turning prematurely brown and losing eye appeal to the customer.

By making still wider slot-like discharge passages 165 and correspondingly increasing their length, still greater radial projection of the meat into these passages is obtained and it is found that the machine is thus adapted for cutting chunks of stew meat. It is not desirable for the pieces of stew meat to have the cell wall structure thereof crushed. This species of the machine is particularly adapted for preparing the non-crushed cell wall stew meat fragments since the ripping teeth 174 together with the increased width of the slot-like passages 165 enable such voluminous portions of the meat to project into the slots that only a relatively small proportion thereof comes in contact with the impact surfaces 168, thereby minimizing crushing of the finished product despite it being prepared with a machine having the same species of cooperative elements as in the hamburger version or the fragmentated barbecue meat version, the difference being primarily one of dimension change.

Access to the meat receiving chamber 158 is facilitated by the pivotal mounting of the hopper tray 179 upon the pivot pin 183. This enables the hopper tray to be pivoted clockwise as viewed in Fig. 12 about the axis of the pin 183 to lift the spout 178 and the feeding tube 177 from the seat 179. The feeder tray may be pivoted far enough clockwise to carry its center of gravity over and beyond the axis of the pivot pin 183 so it will remain in an over center position with the feeding tube 177 separated from the upper end of the meat receiving chamber.

Meat discharged from the discharge passages 165 flows on to the apron 182 from which it is easily discharged, because of the sloping position of this apron, into a suitable receptacle (not shown) below the lower left hand edge of this apron.

Having described a limited number of modifications of the invention with the view of completely and concisely illustrating the same, I claim:

1. In a meat comminuting and crushing machine, a meat-receiving chamber having a principal axis and a curved stationary wall having a smooth obstructionless inner periphery embracing such axis, an impeller rotatable in the chamber about said axis to revolve the meat in said chamber in one circumferential direction about said axis and in sliding contact with the inner periphery of said wall while pressing thereagainst with centrifugal force, said impeller having a cutting edge extending axially of the wall and disposed to sweep in close proximity with said periphery attendant to impeller rotation, said wall containing discharge passages with inner ends at said inner periphery and leading outwardly through said wall, said passages being receptive of surface portions of the meat projected respectively thereinto to cause rippling of the meat surface in sliding contact with the wall, said passages having departure cutting edges at their inner ends and at the sides of said passages from which the revolving meat departs from said passages, the impeller cutting edge being disposed to sweep in shearing relation with the departure cutting edges of the passages, and said passages also having impact sides intersecting the wall inner periphery coincidentally with said departure cutting edges and at an acute included angle not exceeding substantially 75° of which the median projected through the apex of such angle is directed somewhat oppositely to the direction of movement of the meat along said wall.

2. The combination set forth in claim 1, wherein said discharge passages are circular in cross section, and wherein said impact sides of said passages are disposed at a rake angle within the limit of 10° to 25° with respect to chamber radii respectively intersecting their respectively associated departure cutting edges.

3. The combination set forth in claim 2, wherein said impact sides of the meat discharge passages extend at least substantially 3/16 in. radially of said wall.

4. The combination set forth in claim 2, wherein said wall has a thickness substantially within the limits of ³⁄₁₆ in. to ⁵⁄₁₆ in.

5. The combination set forth in claim 2, wherein said passages are cylindrical bores whose axes are substantially in planes perpendicular to said principal axis and in extending inwardly through the wall intersect respective radii to the inner periphery of such wall at an angle substantially within the limits of 10° to 25°.

6. The combination set forth in claim 2, wherein said passages have axes intersecting the inner periphery of said wall and are spaced apart approximately ⅜ in.

7. In a meat comminuting and crushing machine, a meat receiving chamber having a principal axis and a curved stationary wall having a smooth obstructionless inner periphery embracing such axis, said wall containing meat discharge passages leading outwardly from the inner periphery thereof, said passages having respective approach edges and departure edges at diametrically opposite sides of their inner ends, the approach and departure edges of each passage being spaced circumferentially of the wall, said passages having impact sides intersecting the wall periphery coincidentally with their departure edges and at an acute rake angle within the limits of 5° to 25°, said inner periphery of the chamber wall having relieved areas respectively adjacent to the approach edges of said passages and communicating with the passages at said edges an impeller rotatable in the chamber about said axis to revolve the meat in said chamber in sliding contact with said wall periphery and in a direction to approach the passages at their approach edges and depart therefrom at their departure edges, said impeller having a cutting edge extending axially of the chamber and such cutting edge being disposed in close-spaced proximity with the wall periphery to sweep in shearing relation with the passage departure cutting edges attendant to impeller rotation.

8. The combination set forth in claim 7, wherein said discharge passages are clustered within a portion of said wall limited circumferentially thereof, and wherein the relieved areas associated with the discharge passages, having no other discharge passages on the approach side thereof, are in the form of grooves extending circumferentially of the chamber inner periphery substantially coextensive with the remaining portion of said wall.

9. In a meat comminuting and crushing machine, a meat receiving chamber having a principal axis and a stationary curved wall having a smooth obstructionless inner periphery embracing such axis, said wall containing meat discharge passages leading outwardly from the inner periphery thereof, said passages having respective approach edges and departure edges at diametrically opposite sides of their inner ends, the approach and departure edges of each passage being spaced circumferentially of the wall, said passages having impact sides intersecting the wall periphery coincidentally with their departure edges and at an acute rake angle within the limits of 5° to 25°, and an impeller rotatable about said chamber axis, said impeller having a wing with a shearing edge extending axially of the chamber in contiguity with said wall periphery, and said shearing edge being spaced radially of the chamber from said periphery a distance within the limits of approximately .002 in. to approximately .004 in. to sweep in shearing relation with the passage departure cutting edges attendant to impeller rotation in a direction to approach the passages at their approach edges and depart therefrom at their departure edges.

10. The combination set forth in claim 9, wherein the impeller shearing edge is spaced radially from the wall periphery approximately .003 in.

11. In a meat comminuting machine, a meat-receiving chamber having a principal axis and a curved stationary wall having a smooth obstructionless inner periphery embracing such axis, impeller means disposed in said chamber and operable to revolve the meat in said chamber in one circumferential direction about said axis in sliding contact with the inner periphery of said wall while such meat presses thereagainst with centrifugal force, said wall containing discharge passages extending radially therethrough and elongated circumferentially of such wall thereby providing circumferentially spaced narrow extremities for each of said passages, said passages having narrow departure edges within the inner periphery of the wall at their extremities from which the revolving meat departs from such passages, and said passages also having narrow impact sides intersecting the wall inner periphery coincidentally with the respective departure edges thereof and at an acute included angle of which the median line projected through the apex of such angle is directed obliquely oppositely to the direction of movement of the meat in registry therewith along said wall.

12. The combination set forth in claim 11, wherein a series of said passages are in lateral juxtaposition axially of said wall, wherein said wall contains ribs of less width than said passages axially of the wall and disposed between the passages in said series, said ribs forming boundaries for long edges of said passages and constituting separating means therebetween.

13. The combination set forth in claim 12, wherein there are meat cutting means on the sides of said ribs facing inwardly of the chamber.

14. The combination set forth in claim 13, wherein said cutting means is in the form of meat slitting teeth disposed upon edges of said ribs facing inwardly of the chamber.

15. In a meat comminuting machine, a meat-receiving chamber having a principal axis and a curved wall embracing such axis, said wall containing discharge passages extending radially therethrough and elongated circumferentially of such wall thereby providing circumferentially spaced narrow extremities for each of said passages, said passages having narrow departure edges within the inner periphery of the wall at extremities thereof trailing in the same circumferential direction with respect to said chamber and said passages having narrow approach edges within the inner periphery of the wall at their opposite extremities, said passages also having narrow impact sides intersecting the wall inner periphery coincidentally with the respective departure edges thereof and at an acute included angle of which the median is directed inwardly of the wall into diagonal intersection with respective lines extending radially from the chamber axis through such openings in contiguity with such edges, said passages being arranged in lateral juxtaposition axially of said wall, said wall comprising ribs of less width than said passages axially of the wall and disposed between respectively adjacent of said juxtaposed passages and constituting separating means between said passages, the ribs having approach ends adjacent the approach extremities of the passages and departure ends adjacent the departure extremities of the passages, long edges of said ribs facing inwardly of the chamber having relieved profiles receding radially outwardly progressively greater in distance as said profiles extend circumferentially from the approach ends of the ribs generally toward the departure ends thereof for a substantial portion of the distance between said ends where such profiles have radially relieved terminals, and said ribs having meat slitting shoulders extending substantially radially inwardly of the chamber from the radially relieved terminals of said profiles and facing circumferentially of the chamber toward the approach ends of said ribs.

16. The combination set forth in claim 15 wherein the relieved terminals of the rib profiles and the shoulders of said ribs are substantially midway between the circumferentially spaced ends of the ribs.

17. In a meat comminuting machine, a meat receiving and comminuting chamber having a principal axis and a curved stationary wall having a smooth obstructionless inner periphery embracing such axis, said wall containing discharge passages extending radially therethrough and elongated circumferentially of such wall thereby providing circumferentially spaced narrow extremities for each of said passages, said passages having respective narrow shearing edges within the inner periphery of the wall at corresponding of their extremities in one direction circumferentially of the wall, and said passages also having respective narrow impact sides intersecting the wall inner periphery coincidentally with the respective departure edges thereof and at an acute included angle of which the median is directed inwardly of the wall into diagonal intersection with respective lines extending radially from the chamber axis through such openings in contiguity with such edges.

18. In a meat comminuting machine, a meat receiving and comminuting chamber having a principal axis and a curved wall embracing such axis, said wall containing discharge passages extending radially therethrough and elongated circumferentially of such wall thereby providing circumferentially spaced narrow extremities for each of said passages, said passages being arranged in circumferentially spaced series and each series comprising a plurality of such passages spaced laterally from one another axially of said wall, the individual passages of circumferentially adjacent of said series being out of registry circumferentially of the wall, said passages having respective narrow shearing edges within the inner periphery of the wall at corresponding of their extremities in one direction circumferentially of the wall, and said passages also having respective narrow impact sides intersecting the wall inner periphery coincidentally with the respective departure edges thereof and at an acute included angle of which the median is directed inwardly of the wall into diagonal intersection with respective lines extending radially from the chamber axis through such openings in contiguity with such edges.

References Cited in the file of this patent
UNITED STATES PATENTS

| | | |
|---|---|---|
| 308,568 | Munford et al. | Nov. 25, 1884 |
| 1,514,330 | Neal et al. | Nov. 4, 1924 |
| 1,552,458 | Symons | Sept. 8, 1925 |
| 1,738,918 | Napier | Dec. 10, 1929 |
| 1,827,352 | Brown et al. | Oct. 13, 1931 |
| 1,837,102 | Bernhard | Dec. 15, 1931 |
| 2,286,520 | Tranbarger | June 16, 1942 |
| 2,296,608 | Gately | Sept. 22, 1942 |
| 2,416,043 | Bucher-Guyer | Feb. 18, 1947 |
| 2,507,614 | Sarland | May 16, 1950 |
| 2,520,982 | Urschel | Sept. 5, 1950 |
| 2,594,080 | Shafter | Apr. 22, 1952 |
| 2,594,635 | Gamaunt | Apr. 29, 1952 |
| 2,594,785 | Meeker | Apr. 29, 1952 |
| 2,616,819 | Ford | Nov. 4, 1952 |
| 2,624,384 | Ward | Jan. 6, 1953 |
| 2,637,359 | Taylor | May 5, 1953 |
| 2,655,967 | Mallory | Oct. 20, 1953 |

FOREIGN PATENTS

| | | |
|---|---|---|
| 79,579 | Germany | Feb. 12, 1895 |
| 633,752 | Germany | Aug. 5, 1936 |